May 26, 1964   H. S. McCONKIE   3,134,420
INNER TUBE AND RUBBER VALVE
Original Filed Feb. 26, 1958

INVENTOR.
HOWARD S. McCONKIE
BY
ATTORNEYS.

3,134,420
INNER TUBE AND RUBBER VALVE
Howard S. McConkie, 101 Etter St., Hot Springs, Ark.
Original application Feb. 26, 1958, Ser. No. 717,625, now Patent No. 3,038,517, dated June 12, 1962. Divided and this application Feb. 8, 1962, Ser. No. 171,986
6 Claims. (Cl. 152—429)

This invention relates to tubeless type tires, more particularly to a tubeless tire provided with a floating or semifloating inner tube for blowout protection, and is a division of copending application, Serial No. 717,625, filed February 26, 1958, now Patent No. 3,038,517, June 12, 1962.

While tubeless tires have gained general commercial acceptance, they are subject to a number of disadvantages including vulnerability to blowout or sudden collapse with consequent danger to the occupants of the automobile; and difficulty in, and need for, special tools to install the tires on the vehicle wheel rims so as to bulge the tire beads into sealing engagement with the rim to permit inflation.

It is a primary object of this invention to obviate these disadvantages by provision of an inner tube entirely, or nearly entirely, floated within the tire to provide safety against sudden puncture of the tire, and to enable installation of the tire to the rim without need for special tools.

It is a further object of the invention to provide a double air compartment within a tubeless type tire, one compartment completely surrounding the other, except at possible points of attachment.

Yet another object is to provide an inner tube which can be installed completely within a conventional tubeless tire on a conventional wheel rim of any type including drop center.

Still another object is to provide a safety member for tubeless tires for security in event of blowout without sacrificing the comfort of or other qualities of the ride and performance of the tire.

A still further object is to provide an inner tube for tubeless tires which is easy to mount and inflate and which enables the tubeless tire itself to be more easily mounted and inflated.

Yet another object is to provide an inner tube, for a conventional tubeless type tire, of simple construction and relatively inexpensive to manufacture.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

Figure 1:
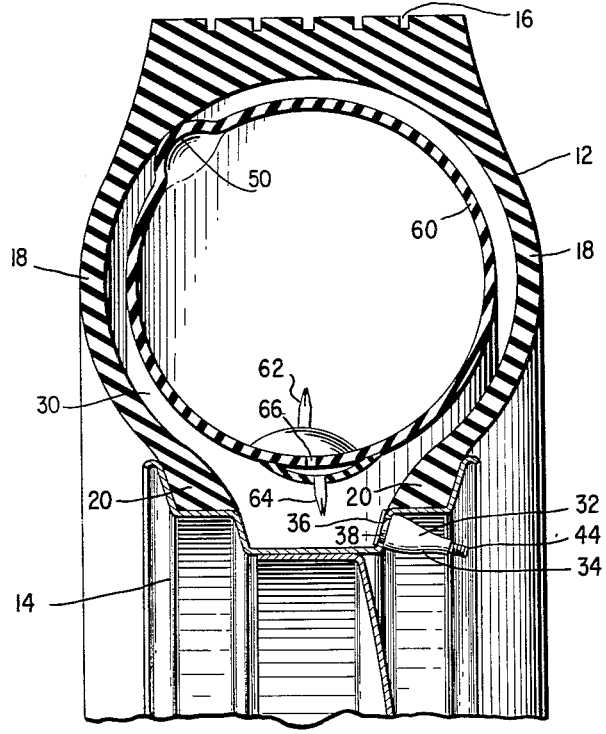
FIG. 1 is a transverse radial section of a tubeless tire mounted on a drop-center rim assembled with an inner tube according to the invention.

Referring now to the drawings, the invention is shown in FIG. 1 as embodied in an inner tube 60 which is floated at least partially freely entirely within a conventional tubeless tire 12 mounted on a drop-center wheel rim 14. The details of construction of the tire are well known to those skilled in the art and need not be described here. It is sufficient to say that the tire has the usual tread 16, sidewalls 18 and rim engaging beads 20.

The inner tube 60, similar to tubes of conventional construction as used with tubed tires, is modified as shown in the drawing, and comprises a thin walled endless rubber tube, doughnut shaped when inflated, and is inflatable through special valves to be described later.

The tire 12 is inflated by means of an inflation valve 32 including a stem body 34 which protrudes through a hole 36 in the wall of the drop-center rim 14. The valve 32, preferably, is the usual type of rubber bodied valve employed with tubeless type tires and the rim hole 36 is air sealed by means of a snug fit of the rim portion surrounding the hole 36 within an annular recess 38 surrounding the stem. The valve stem 34 and removable valve core with protruding nipple designated 44, may be of conventional construction generally in use with tubeless tires.

Figure 2:
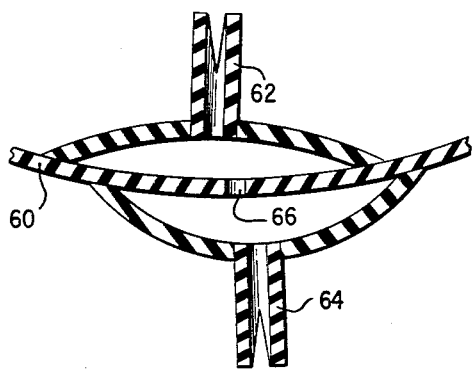
FIG. 2 is an enlarged fragmentary sectional view of the tube valve arrangement shown in FIG. 1.
Figure 3:
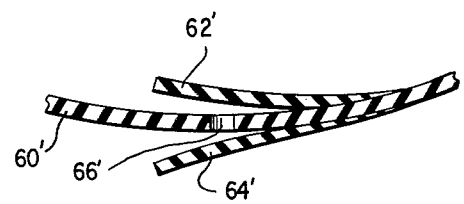
FIG. 3 is a view similar to FIG. 2, showing a modified valve structure.

In FIG. 1 is illustrated an inner semifloating tube 60 which is provided with a pair of flutter valves 62, 64. As best shown in FIG. 2, these valves are cooperatively disposed on opposite sides of a wall of the tube 60, in operative relation to an opening 66 in the tube wall, to operate in opposite directions. The flutter valves are each soft rubber valves of conventional construction which permit movement of air in one direction only except under extreme surges of pressure. Valves 62 and 64 being opposed, prevent air from entering or leaving the tube 60 once the tube is inflated. In lieu of the flutter valves 62, 64, conventional flap or leaf valves 62', 64', as shown in FIG. 3, may be disposed on opposite sides of the tube wall 60' in covering relation to an opening 66' therein.

To install the tire 12 and tube 10, the operator will first remove the stem 34, or if the stem is oversize he will remove the core 44 from valve stem 34. He will next insert one beaded edge 20 of tire 12 into the drop-center channel of the rim. The deflated tube 60 is then inserted in the tire 12 with the valve 64 positioned in the rim opening 36 or in the valve stem 34 from which the core has been removed, and held as so positioned if desired by a hollow needle stem to be used for passing inflating air to the tube. The other beaded edge 20 of the tire 12 is next mounted or inserted into the drop-center channel of the rim.

To inflate tube 60, the hollow needle valve stem (not shown) which has been carefully inserted through stem 34 and through valves 64 and 62 (or past valves 62', 64') and through stem 34 if the stem is not removed, and held in alignment with the opening or stem, is used to fill tube 60 with inflating air and the needle is then withdrawn. The operator may before withdrawal of the needle, to insure against leakage or effusion of air from tube 60 after the tire is inflated, apply a small amount of rubber cement through the hollow needle valve stem to the lips of the outer flutter valve 64, the inner flutter valve 62, or both, which valves are accessible through the rim opening or stem 34. Normally, however, the paired flutter valves will prevent such leakage. When cementing is to be used, one flutter valve is sufficient if considerable care is exercised.

Preferably, about half the operating pressure of the tire is used in the tube, or about 10–15 lbs./square inch, for pleasure vehicles. This pressure will extend tube 60 to fill the entire space within the tire and bulge the tire walls 18 and beads 20 outwardly so that both beaded edges 20 press against the rim seats 46 in air sealing engagement, or sufficiently so that when higher pressure is placed in the tubeless type tire, as later described, the beads will move into the usual complete air sealing engagement with the rim.

Air is then fed through valve 32 into the tire 12 until an operating pressure from 20–30 lbs./square inch is reached. This will compress tube 60 and surround it with a cushioning rim of air in space 30. It is apparent that the installation process described is simple and easy to perform and needs no special tools, avoiding the requirement for external peripheral compressing devices normally used to install tubeless tires which expand the beaded edges against the rim seats 46.

In use of the tire with greater pressure therein than originally placed in the tube 60, the tire will carry the load and the tube, as a safety device, will float freely therein with some relative rotational movement at high speeds. Any resulting vibration and unbalance may be reasonably avoided by applying balancing centrifugal weights to the tube, not shown.

When the tire 12 suffers a leak, crack, puncture or blowout, the air will be released from space 30; tube 60 will expand to fill the tire. The tube 60 will safely carry the weight of the vehicle for an indefinite period, but the soft appearance of the tire will indicate need for repair.

To repair the tire after a puncture, which requires removal of the tire from the rim, valve core 44 is removed, and a hooklike instrument, not shown, may be inserted through stem 34 to seek and align the flutter valve with the stem 34 for reinsertion of the needle valve to deflate the tube. If the tube is fully free floating, however, it is probable that the flutter valve is displaced from the stem 34 and in this event, it will be necessary to insert a sharp instrument to puncture the tube. When the air in tube 60 is released and the deflated tube and tire removed from the rim, both the tire and the tube may be repaired.

The inner tube 60 may be secured to the inner surface of tire 12 at one or more circumferentially spaced protrusions 50. If desired, this securement may be continuous in a broad line circumferentially of the outer periphery of the tube. Preferably, the securement is made at points spaced slightly to one side of the center of the tire as this will lessen the likelihood of puncturing the tube. The securement may be accomplished by placing rubber cement on the inner wall of the tire at the spots where attachment is desired. When the tube is inflated, it will adhere to the cemeted spots.

As an alternative, the tire and tube may be vulcanized together during manufacture. When the tire is inflated, the tube 60 will be compressed to provide the air space between the tube and tire everywhere except at the protrusions 50. The securement of the tube to the tire at protrusions 50 greatly limits relative movement which might otherwise occur at high speeds of rotation.

While the tubes herein referred to may be of wholly rubber construction, alternatively they may be so-called safety tubes of the well known type having a protectively reinforced dome portion to resist friction with or pinching by the tire, or puncture by a sharp object.

The inner tube with flutter valve is ideally suited for use as a fully free floating inner tube. While the use of helium, carbon monoxide or other gas that is lighter than air should be considered for use in any floating inner tube, it should be of particular importance when used in this flutter valved floating tube.

Another advantage for the floating inner tube as described for use in a tubeless type tire is the decrease in inertia in the initial stages of abruptly changing the rotational rate of the tire, tube and wheel rim assembly. In abrupt acceleration of a motor vehicle, the floating tube will not increase its rate of revolution as rapidly as the tire itself. It can be said to slip for awhile. It will, in fact never rotate as fast as the tire during acceleration nor while maintaining a constant rate of revolution. It is moved in rotation only by the air stream within the tire and by occasional contact friction with the tire or rim. Since it takes a considerable amount of energy to rotate an inner tube, the adoption of this floating tube will permit faster acceleration for pneumatic tubeless type tire assemblies as described.

The reverse will be true when decelerating, especially when applying braking power to decrease the rate of revolution of this assembly. The general application of these savings will be considerable and may be of particular significance to race track vehicles where a great deal of abrupt acceleration and deceleration is of vast importance. As stated above, bringing the tire and wheel rim to an abrupt stop will not stop the tube's revolving immediately. In fact, the energy of this revolving tube can be utilized in again abruptly starting if such start is undertaken before the tube ceases to rotate. On muddy race tracks and on the highways during icy road conditions, this can be a matter of considerable importance.

What is claimed and desired to be secured by Letters Patent is:

1. An inner tube comprising a continuous doughnut-shaped body at least partially formed of an elastic rubber-like material, a single valve opening in the wall of said body, and a pair of flutter valves oppositely disposed on the outside and inside of the body to prevent ingress and egress of air through said valve opening once the tube is filled, each of said flutter valves being a dome-shaped member having an opening seating one end of a flexible tubular conduit, the other end of said conduit being split to provide flaps closable by pressure surrounding the conduit, said body being adapted to be inflated by application of a hollow needle through said valve opening and past at least one of said flutter valves.

2. An inner tube according to claim 1 wherein the flexible tubular conduit associated with the outer dome-shaped member extends outwardly and the flexible tubular conduit associated with the inner dome-shaped member extends inwardly of the tube body.

3. In combination, a tubeless tire mounted in air sealing engagement with a wheel rim, an opening in said rim and a valve stem in said opening communicating with the space within the tire for admitting air to the tire, a continuous, hollow, annular inner tube within said tire and spaced from the walls of the tire and from said rim, a single valve opening only in a wall portion of said inner tube adjacent the rim, a pair of opposed, aligned flutter valves mounted on opposite sides of said valve opening and operative to prevent ingress of air to and egress of air from the inner tube except by application of a hollow inflating needle through said rim opening and valve opening.

4. The combination according to claim 3 wherein protrusions are provided at spaced points on the inner tube and secured to the inner surface of the tire.

5. The combination according to claim 3 wherein at least one of said flutter valves is closed by cement.

6. The combination according to claim 3 wherein each of said flutter valves comprises a flap of yieldable material secured at one side of said valve opening and pressed against the opening to seal it by air pressure.

References Cited in the file of this patent
UNITED STATES PATENTS

| | | |
|---|---|---|
| 2,301,096 | Truscott | Nov. 3, 1942 |
| 2,802,504 | Lyon | Aug. 13, 1957 |

FOREIGN PATENTS

| | | |
|---|---|---|
| 578,007 | France | June 20, 1924 |